Patented Aug. 2, 1938

2,125,776

UNITED STATES PATENT OFFICE 2,125,776

COMPOSITE MOLDING COMPOSITION AND PROCESS OF MAKING SAME

Carleton Ellis, Jr., Montclair, N. J., assignor to Plaskon Company, Incorporated, a corporation of Delaware No Drawing. Application October 31, 1935, Serial No. 47,614

2 Claims. (Cl. 106—22)

This invention relates to a composite molding composition and process of making same and particularly to a quick curing molding composition comprising keratinous material and urea-formaldehyde resin, and further relates to the process of making such compositions.

As a keratinous stock or substance I prefer to employ cattle horn or suitable parts thereof, especially the horn of the ox, sheep, goat, and the like, but also including other keratinous parts of animal substances.

Such keratinous stock usually is composed of the elements carbon, nitrogen, oxygen, hydrogen and sulphur in varying proportion. Unlike bone, it contains only a trifling proportion of mineral matter. The essential part of the keratinous material is the organic tissue which is reactive to a sufficient extent with aldehydes, such as formaldehyde.

Furthermore, keratinous substances characterized, for example, by horn, absorb dyes with great facility, which enables colored masses to be molded in many desirable shades.

To prepare the horn or other keratinous stock as a preliminary to making a molding composition, preferably I clean and soften the raw stock by cooking or steaming for a short time, rinsing as may be required to remove dirt, and grind the softened material to a powder. Or the dry horn and the like may be ground by means of a hammer mill or similar mechanical pulverizer and if desired put through an air separator to obtain a powder of the requisite degree of fineness. This preferably will range from powders of 40 or 50 mesh up to, say 100 mesh (by mesh I refer to screens having openings of this number to the linear inch).

A solution of urea-aldehyde resin in its initial stage is prepared by reacting urea with an aldehyde, particularly formaldehyde as obtainable in solution under the name of Formalin and containing 30 to 40 per cent of formaldehyde with water, methyl alcohol, and the like; preferably the proportion of methyl alcohol is kept as low as possible as excessive amounts of methanol tend to retard cure. Ordinarily Formalin containing about 6 to 8 per cent of methanol is preferred.

Preferably I add to the horn while the latter is still in the form of a dry powder a sufficient amount of dye or coloring agent to give the requisite color to the finished product. Also at this stage I may add a mold lubricant, such as a metallic soap, zinc stearate being suitable, preferably also introducing a very small quantity of petrolatum or other oil of this general character. Such a mixture may be thoroughly blended or incorporated by use of a ball mill or a Werner-Pfleiderer type of mixing apparatus. To this mix then may be added the urea liquor, thorough mixing being accomplished by suitable agitation. Then it is desirable to extrude the composition in the form of thin strips or strings or "noodles". Such extrusion preferably is carried out by allowing the extruded material to fall on a belt conveyor or enter a rotary dryer, etc., the material in any event being dried at a temperature of, say, 70° C. and the resulting dried noodles being passed through a cutting or chopping machine which chops the dried composition into small pellets or granules which are then ready for molding. Sometimes, however, it is desirable to preform the material to make a preform or tablet of suitable size and shape for molding, whereupon hot pressing ensues.

One advantage of the employment of horn powder in this way as contrasted with the usual cellulose material employed in urea resin molding compositions is that there is not that retention of moisture in the stock which occurs when cellulose is present, as is evidenced by the fact that the horn-resin composition dries more rapidly. This result greatly simplifies manufacturing operations. I do not, however, wish to exclude the possibility of employing cellulose with the horn if desired but preferably I do not employ a filler such as cellulose but make my composition of two cooperating plastic substances without any filler. Horn is reactive with formaldehyde and the initial condensation product of urea and formaldehyde disengages formaldehyde during the drying step and also during the molding operation so that the horn, being in intimate contact with the urea material, reacts with the disengaged formaldehyde to form the composite molded material of the present invention.

This, as stated, preferably I use without any filler, although I do not wish to be limited to compositions of this sort as it is possible to add fillers such as cellulose, chalk, clay, asbestos, and so forth.

However, by avoiding the use of cellulose and analogous fillers and confining the composition substantially solely to a non-filled or unfilled material consisting essentially of the two co-reacting plastics, that is, the horn and the urea-aldehyde resin, I find that the molding composition obtained is less sensitive to heat during the molding operations, that is sensitive in an unfavorable way. If a urea resin-cellulose composition is hot pressed at a temperature of, say, 160° C., it is necessary to withdraw the product from the molds very quickly after thermosetting reactions have been accomplished as the product at that stage is highly heat-sensitive and continued exposure to such heat may cause white opaque gas blisters over the surface. Thus a cellulose composition curing in, say, 2½ minutes time if left in the mold one minute longer, that is to a total of 3½ minutes, will shortly be found to have its surface impaired by the aforesaid gas blisters. On the other hand, I have been able to use an unfilled plastic of the horn-urea resin type exposing it in the mold at 160° C. for a period of 5 minutes without the formation of gas blisters and obtaining a surface which bears the sharp impress of the mold and possesses sufficient surface translucency to develop the dye coloration to a high degree of brilliancy.

Translucency is highly important, especially in the production of molded goods such as buttons, combs, and the like, since the brilliancy of color obtained by a translucent condition gives a richness and depth of color which is sufficiently ornamental to render the products having this property more saleable than when the surface has a dead appearance. The same observation holds good for cups or other domestic ware, electrical fixtures, radio cabinets, ornamental boxes, buckles, and the like.

A further quality of my unfilled composition is its elasticity, especially when hot, which enables a stripping composition to be made. By a stripping composition I refer especially to that term as applied to the making of bottle caps and container-jar caps having threaded projections molded into the cap. Urea-aldehyde-cellulose compositions as ordinarily made are a trifle too brittle when hot to be sprung from the mold rather than unscrewed. Phenol-aldehyde resins per se possess such flexibility that, when used to mold threaded bottle caps, the caps may be stripped from the threads of the mold while the caps are hot. For this reason the ordinary urea-aldehyde resin compositions up to the present time have not been able to compete with the phenol-aldehyde resins in the manufacture of internally threaded articles. The horn-urea-aldehyde resin composition, however, is sufficiently elastic so that it may be sprung from the mold or stripped, as the trade calls the operation, the elasticity of the material at this stage being sufficient to allow the cap to be pushed over the threads of the mold and removed without injury either to the mold or the threads of the cap.

The effect of the horn plastic is so far reaching that the addition of horn to a urea-aldehyde-cellulose type of molding composition which will not strip per se will render that composition sufficiently elastic to strip adequately. An approximately ten per cent addition of horn exerts so great an influence that the composition of horn plastic-urea plastic and cellulose will strip adequately.

This property of relatively high flexibility in addition to translucency particularly fits the horn-urea-aldehyde resin for use in the manufacture of combs, buttons and similar articles. These articles require a certain degree of flexibility in order to properly perform the functions for which they are intended. Urea-aldehyde resins as usually made do not possess the required degree of flexibility to make articles of this kind which will stand up during use. The horn-urea-aldehyde resins on the contrary, because of the flexibility imparted by the horn, are admirably suited for making such articles.

For many purposes where cheap compositions are required, especially those dyed to darker shades of color such as buttons, for example, I may use with a horn plastic a certain proportion of wood flour but for white or ivory colored products preferably I employ, when cellulose is to be incorporated, only such cellulose stock as is white or light in color, such as highly refined cellulose known as alpha cellulose or cheaper grades such as sulphite pulp. Preferably such cellulose when used is admixed with horn only to the extent of from 5 to 10 per cent up to 50 per cent or so of the amount of horn employed. As a rule I prefer a predominating proportion of horn to cellulose but in some cases the filler, that is the cellulose, may be added in a larger proportion. It should be noted that when cellulose is present the drying time will be substantially prolonged over that period required in drying the unfilled horn-urea resin molding stock.

With the horn there also may be incorporated a greater or lesser proportion of other animal substances such as glue, casein, albumin, dried blood, and so forth, and in general the composition comprises keratinous substances characterized by horn which are capable of uniting with formaldehyde to become more resistant to water and generally harder, incorporated with urea resin sufficiently to create good flowability. Horn, for example, does not flow in the mold like a synthetic resin which first melts and then hardens, it being generally understood that horn is simply welded together when hot pressed as, for example, in making buttons by that procedure. On the other hand, when the horn is incorporated with the urea-aldehyde resin the quality of flow is given to the composition and hence the advantages of horn without its disadvantage of lack of flow are secured by proceeding in accordance with the present invention. Thus it may be considered that on hot pressing an unfilled mixture of horn and urea-formaldehyde resin the latter softens and flows carrying the horn particles with it and at the same time some formaldehyde is given off which is absorbed and reacted into the horn substance. As temperature and pressure continue to be applied in the hydraulic press the urea-aldehyde resin thermosets and at the same time the horn is further hardened by the action of the aldehyde, heat, and so forth.

A noticeable improvement also is secured when using horn over that resulting when the usual cellulose filler is employed in that little or no gas evolution in the mold results. At the present time I am unable to state whether this is due to absorption of free formaldehyde by the horn or just what chemical effect is responsible for this condition, simply contenting myself with noting the fact.

The following are examples which illustrate a number of the compositions indicated in a general way in the foregoing.

Example 1

The preparation of the urea-aldehyde resin initial condensation may be carried out by reacting 756 pounds Formalin of about 37-40 per cent formaldehyde strength and of pH 3.8 with 374 pounds of urea. Preferably before reaction with the urea the Formalin is partially neutralized by the addition of, in this case, 95 cc. of aqueous sodium hydroxide solution 20 per cent strength, serving to bring the pH of the formaldehyde to about 5.6. The mixture of the urea and Formalin is heated up to 85° C. for, say, 15 or 20 minutes and after digestion for a short time 6 pounds of an activator (dichlorhydrin) are introduced and when well incorporated the syrupy condensate is ready to be mixed with the horn material.

It may be noted at this point, however, that the condensate can be concentrated, if desired, as by vacuum evaporation, or can be thinned by the addition of, for example, water or any suitable organic solvent which is volatile, or a mixture of water and such organic solvent. A less concentrated syrup is better adapted when mixed with horn to give products which can be spray-dried or sprayed on a heated revolving drum or similar apparatus to eliminate the water and/or volatile organic solvent.

A proportion of horn suitable for the purpose is about 50 per cent by weight of the total solids of the urea resin but such proportions may be varied to meet various requirements needed in the molded article. Likewise, as I have indicated, there may be used a filler such as cellulose, asbestos, and the like, in addition to the composition consisting essentially of the two cooperating plastic substances.

The horn-urea-aldehyde molding compositions possess a notable degree of water resistance as determined by a test consisting in boiling a molded specimen in water for a given period. The effect of boiling water on the surface and throughout the composition is ascertained and if the surface in particular is not impaired by boiling for a moderate time in water the degree of cure is considered adequate. Rate or speed of cure is, of course, very important in molding as the molding trade requires, generally speaking, compositions which will cure in the space of a comparatively few minutes. The composition consisting essentially of the two cooperating plastics appears to cure in a relatively short space of time. Thus a urea-aldehyde resin molding composition which contains no horn but has cellulose as a filler was cured for a period of two minutes and was then found to be slightly affected by water in the boiling test. A somewhat similar composition but containing horn in place of cellulose was found to have its surface substantially unaffected by water in the boiling test even though the cure was less than one minute.

Another advantage arising from the use of horn as the essential cooperating plastic with the urea-aldehyde resin is that there is much less likelihood of burning the molded article if the temperature of the mold is too high or the molded article for any reason is kept in the mold for too long a period. This is a great advantage in eliminating the number of rejects which occur in almost any molding plant.

With respect to the treatment of the horn prior to mixing it with the urea-aldehyde resin syrup in accordance with the preferred process of the present invention, the horn specified as above is mixed with 3.5 pounds of dyestuff and from 2 to 5 pounds of mold or preforming lubricant, the horn preferably being ground to about 80 mesh. The charge of horn, dyestuff and lubricant is well mixed in any suitable mixing machine, such as a Werner-Pfleiderer apparatus or a ball mill, and the like, and when a uniform mixing has been secured the mixture is incorporated with the urea resin syrup as above. It is then compressed in an extrusion apparatus and forced through apertures under a pressure preferably of several atmospheres to extrude as strings or sheets, and the like, which preferably are placed on a traveling belt conveyor and passed into a drying chamber. The drying temperature of the latter is held at about 70° C. and when the strings or sheets emerge they are passed through a cutting apparatus where they are chopped into small granules or pellets forming a composition which has a sandy texture. This sand-like material is then ready for molding or for preforming and molding.

In some cases the powdered horn may be previously treated with Formalin or other type of formaldehyde prior to its incorporation with the urea resin initial condensate.

A large number of variations are possible in the foregoing procedure. For example, in some cases a moderate amount of glue may be incorporated, which has the advantage that a concentrated glue solution on contact with Formalin solidifies or becomes insoluble and tends to set the entire plastic to a degree dependent upon the amount of glue present, thus enabling the degree of plasticity and the character of the extruded material to be suitably modified in this way at will. A replacement of part of the urea by thiourea sometimes assists in improving flexibility and since the making of comb blanks is contemplated in accordance with the present invention I aim, for such purpose, to prepare a composition which gives a product of a high degree of flexibility. A comb blank may be sawn to form the teeth of the comb and then be buffed to remove the raw edges produced by sawing or in some cases, especially when the comb is made with coarse teeth well spaced apart, the comb may be molded directly from a suitable flexible composition. While I prefer to employ formaldehyde especially in the commercial grade of Formalin preferably containing about 6% or so of methanol, I may employ acetaldehyde or other appropriate aldehyde, particularly to replace a part of the formaldehyde for the purpose of obtaining different rates of cure or modified flexibility and the like.

Example 2

*Example of jet black horn urea resin*

| | Parts |
|---|---|
| Horn meal (about 80 mesh) | 400 |
| Super Spectra Black | 8 |
| Zinc stearate, or other lubricant | 1.4 |

This mixture is mixed in a ball mill for 2 hours. It is then dumped and mixed intimately with 800 to 1300 parts of the above urea formaldehyde initial condensation product in a Werner-Pfleiderer, or in other suitable apparatus.

The mixture is extruded as strings, strips or noodles and is dried on a moving conveyor or in a rotary dryer.

In cases where a soluble protein, such as, for example, glue is used, the syrupy mixture can be spread out to dry, and the action of any free formaldehyde serves to convert the protein from the soluble to the insoluble form.

EXAMPLE 3

*Example of bright red horn-urea-formaldehyde resin*

|  | Parts |
|---|---|
| Horn meal | 400 |
| Lithol Rubine BKD | 1.81 |
| Vulcan Fast Orange G | 1.13 |
| Lithopone | 8 |
| Zinc stearate mold lubricant | 1.4 |

The procedure can be the same as in Example 2.

EXAMPLE 4

*Example of brown horn-urea-formaldehyde resin*

|  | Parts |
|---|---|
| Horn meal | 400 |
| Phenoform Brown G | 1.68 |
| Phenoform Brown 5B | 0.471 |
| Phenoform Black | 0.049 |

The procedure to be followed is the same as in Example 2.

The proportion of urea-aldehyde resin syrup used in the foregoing examples can be varied to suit the requirements. If a soft flow (represented by the figures 40–45) and material which is rigid on removal from the mold is required, a high percentage of urea resin is desirable, but if a hard flow (60–65) material which is rubbery on removal from the die is required, a low percentage of the resin is used.

The above is also found to be true when using a cellulose filler, except that the speed of the cure is largely affected by change in the urea-aldehyde resin content, whereas, with the horn, the cure, determined by water resistance, seems to be equally as good with high or low resin content.

Although cellulose by itself, that is without any added binder, cannot be molded in the sense as used herein to obtain a coherent interfused or intermingled product, it should be noted that horn alone may be and is molded without a binding agent since it behaves rather more as a plastic body. Various articles may be molded in a positive type die from horn alone, which is not the case with cellulose by itself. In the present invention the horn-urea-aldehyde product formed is nicely plastic, especially lending itself to those molding operations where heat-elasticity or heat-flexibility is required.

As a further modification of the invention I sometimes may use a spray drying operation to dry the horn-urea-aldehyde composition without passing through the steps noted above. That is to say, the wet composition in a sufficiently fluent form to pass through spray nozzles may be thus ejected and exposed to a current of heated air to remove the moisture, causing suitable drying of the composition.

What I claim is:

1. Hot pressed objects consisting of urea aldehyde horn condensation products having internal projections which mesh with projections on the hot press, said objects by virtue of their horn content having such flexibility when hot as to permit said projections thereon to be sprung over the projections of the mold without breaking of said objects.

2. Molded internally threaded bottle caps consisting of urea aldehyde horn condensation products which, due to their content of horn have such flexibility when hot as to permit said caps to be stripped from the threads of the mold without breaking of said caps.

CARLETON ELLIS, Jr.